United States Patent
Fan

(10) Patent No.: US 10,385,711 B2
(45) Date of Patent: Aug. 20, 2019

(54) ELASTIC SHEET USED FOR TURBINE FOLLOW-UP SUSPENDED STEAM SEAL BELT AND STEAM SEAL STRUCTURE THEREOF

(71) Applicant: QINHUANGDAO YULIN ELECTRIC POWER EQUIPMENT CO., LTD., Qinhuangdao (CN)

(72) Inventor: Hongcai Fan, Qinhuangdao (CN)

(73) Assignee: QINHUANGDAO YULIN ELECTRIC POWER EQUIPMENT CO., LTD., Hebei (CN)

( * ) Notice: Subject to any disclaimer, the term of this patent is extended or adjusted under 35 U.S.C. 154(b) by 0 days.

(21) Appl. No.: 15/759,175

(22) PCT Filed: Jan. 12, 2016

(86) PCT No.: PCT/CN2016/070628
§ 371 (c)(1),
(2) Date: Mar. 9, 2018

(87) PCT Pub. No.: WO2017/092158
PCT Pub. Date: Jun. 8, 2017

(65) Prior Publication Data
US 2018/0258780 A1    Sep. 13, 2018

(30) Foreign Application Priority Data
Dec. 1, 2015   (CN) .......................... 2015 1 0858809

(51) Int. Cl.
*F01D 11/00* (2006.01)
*F01D 11/02* (2006.01)
(Continued)

(52) U.S. Cl.
CPC ............ *F01D 11/00* (2013.01); *F01D 11/001* (2013.01); *F01D 11/02* (2013.01); *F16J 15/3208* (2013.01);
(Continued)

(58) Field of Classification Search
CPC ...... F01D 11/003; F01D 11/001; F01D 11/02; F01D 11/025; F16J 15/442; F16J 15/40
See application file for complete search history.

(56) References Cited

U.S. PATENT DOCUMENTS 9,605,550 B2 *  3/2017  Graves ................ F01D 11/005
2004/0018085 A1   1/2004  Dhar et al. ................ 415/174.2

FOREIGN PATENT DOCUMENTS

CN    2672289 Y    1/2005
CN    1877085 A    12/2006
(Continued)

OTHER PUBLICATIONS

The International Search Report of corresponding International PCT Application No. PCT/CN2016/070628, dated Aug. 30, 2016.
(Continued)

*Primary Examiner* — Eldon T Brockman
(74) *Attorney, Agent, or Firm* — J.C. Patents

(57) ABSTRACT

The present invention discloses an elastic sheet used for a turbine follow-up suspended steam seal belt and a steam seal structure thereof, which comprises a plurality of elastic L-shaped metal sheets correspondingly overlapped on the same rim, one rim of the L-shaped metal sheet is a toothed rim, the toothed notches of the toothed rim extend laterally through the entire toothed rim so that the other rim of the L-shaped metal sheet can be bent longitudinally toward the toothed rim to form an arc shape; the toothed notches and the toothed tabs of the toothed rims of the plurality of L-shaped metal sheets are misoriented with each other to cover the
(Continued)

toothed notches, and the other rim of the L-shaped metal sheet is fixed within the arc-shaped steam seal ring block along the steam seal ring teeth, the steam seal ring teeth extend out from the top of the toothed rim to seal the gap between the seal ring teeth and the turbine main shaft, and the toothed rims of the L-shaped metal sheet perform elastic beating reciprocately down after being subjected to the force at the top; the invention has the advantages of simple structure and the sealing of the main shaft side is well achieved; and the main shaft of the turbine can be completely achieved by utilizing the elastic characteristics of the seal elastic sheet of the invention.

20 Claims, 4 Drawing Sheets

(51) Int. Cl.
*F16J 15/40* (2006.01)
*F16J 15/3208* (2016.01)

(52) U.S. Cl.
CPC ........... *F16J 15/40* (2013.01); *F05D 2220/31* (2013.01); *F05D 2240/55* (2013.01); *F05D 2300/171* (2013.01); *F05D 2300/172* (2013.01); *F05D 2300/173* (2013.01)

(56) References Cited

FOREIGN PATENT DOCUMENTS

| | | |
|---|---|---|
| CN | 202673374 U | 1/2013 |
| CN | 203161303 U | 8/2013 |
| CN | 104896101 A | 9/2015 |
| CN | 204609955 U | 9/2015 |
| CN | 205189962 U | 4/2016 |
| EP | 0 903 519 A1 | 3/1999 |
| EP | 0 933 567 A2 | 8/1999 |

OTHER PUBLICATIONS

The Chinese First Examination Report of corresponding Chinese application No. 201510858809.2, dated Jun. 28, 2016.

\* cited by examiner

US 10,385,711 B2

ELASTIC SHEET USED FOR TURBINE FOLLOW-UP SUSPENDED STEAM SEAL BELT AND STEAM SEAL STRUCTURE THEREOF

CROSS-REFERENCE TO RELATED APPLICATION

This application is a national phase application of international application No. PCT/CN2016/070628 filed on Jan. 12, 2016, which in turn claims the priority benefits of Chinese application No. 201510858809.2, filed on Dec. 1, 2015. The contents of these prior applications are hereby incorporated by reference in their entirety.

TECHNICAL FIELD

The present invention relates to the field of steam turbines and gas turbines, and in particular relates to an elastic sheet used for servo suspension-type steam seal belt of a turbine and a steam seal structure thereof.

BACKGROUND ART

Turbine is an engine generating power by impacting the impeller with fluid to rotate. It can be divided into steam turbines, gas turbines and water turbines, and it is widely used as a power machine for power generation, aviation, navigation and the like. Steam seal is a steam seal component for steam turbines and gas turbines, and the purpose is to seal steam of the steam turbine to improve steam utilization. A main shaft steam seal component of a steam turbine or a gas turbine is radially disposed on the main shaft, in order to prevent the seal component from dynamic and static contact with the main shaft, the seal component and the main shaft must be designed with a gap therebetween, and there will be a problem of increased steam leakage if the gap is too large, and efficiency of the steam turbines and gas turbines is reduced. Dynamic and static friction will easily be caused if the gap is too small, resulting in accidents. Steam seals are introduced for meeting both requirements.

At present, the traditional seal methods in the art are labyrinth seals, honeycomb seals, brush-shaped flexible tooth steam seals and the like. The labyrinth seals are carried out through multi-stage throttling expansion to consume steam flow energy to have a damping effect, so as to achieve the purpose of reducing the leakage of steam along the axial gap. Due to the annular chamber between the teeth, the annular flow greatly reduces the effect of the vortex deceleration. The steam blocking effect is poor and the amount of leakage is large so that the desired sealing effect cannot be achieved. At the same time, when there is an uneven during steam seal gap (which is hard to avoid in practical work), due to the larger amount of leakage, the energy of excitation is also large. The excitation of steam flow generated by the high-pressure rotor of turbine is hard to be solved once occurred, which endangers safe operation of the unit. With the above sealing method, there is no withdraw mechanism when the static and dynamic contact occurs or the withdraw mechanism is rough, which is more likely to cause increased turbine vibration, threatening the safety operation of the turbine unit; the sealing effect will be affected when the brush filaments of the brush-shaped flexible tooth are easily subject to falling over and fracture in cylindrical multi-filament arrangement against high-pressure and high-speed airflow flush.

SUMMARY OF THE INVENTION

The existing steam seal technology is focused on increasing the resistance of the airflow via adopting proper structure and shape, so as to prevent the leakage of the high-pressure steam. However, no matter what structure is adopted, the effect of such structure is not always satisfactory. If there is a steam seal having elastic function, the air gap can almost be completely sealed, but the steam seal will not adversely affect the main shafts of the steam turbines and gas turbines, which will be the best solution. Therefore, an object of the present invention is to provide an elastic sheet used for a servo suspension-type steam seal belt of a turbine and a steam seal structure thereof, and is directed to an elastic sheet used for a servo suspension-type steam seal belt of a steam turbine and a gas turbine and a steam seal structure thereof. The steam sealing effect of the turbine shaft can be greatly improved by providing a plurality of elastic static and dynamic steam seal belts towards around the shaft of a steam turbine or a gas turbine.

In order to achieve the aims, the technical solution is as follows:

An elastic sheet used for a servo suspension-type steam seal belt of a turbine is provided, which is an elongated metal sheet, the metal sheet is bent along the longitudinal direction of the elongated shape to form an elongated L-shape, one rim of the L-shaped metal sheet is a toothed rim alternately formed from a plurality of notches and fingers, the notches extend laterally through the entire toothed rim so that the other rim of the L-shaped metal sheet can be bent longitudinally toward the toothed rim to form an arc shape; The notches continue to extend to corresponding openings on the other rim, so that the fingers of the toothed rim suspend in the turbine steam seal gap due to the openings of the other rim and can perform elastic reciprocating movement up and down.

The scheme is further as follows: the L-shaped metal sheet is a 90-degree right-angled L-shaped metal sheet, the notches laterally extend and are perpendicular to the other rim of the metal sheet, and the widths of the notches are smaller than the widths of the fingers.

The scheme is further as follows: the length of the openings on the other rim of the metal sheet extended from the notches is equal to or greater than half the width of the other rim of the metal sheet.

The scheme is further as follows: the widths of the fingers are from 2 mm to 5 mm.

The scheme is further as follows: the notches of the toothed sheets are trapezoidal notches which are wider at the top and narrower at the bottom, the trapezoidal notches are set with trapezoidal angles so that the notches change from trapezoidal notches into straight notches after the other rim of the metal sheet is bent into the arc shape; the openings on the other rim of the metal sheet forwardly extend from the narrower end of the trapezoidal notches.

A servo suspension-type steam seal structure of a turbine includes a steam seal circular ring arranged around a turbine main shaft, the steam seal circular ring is composed of a plurality of arc-shaped steam seal circular ring blocks abutting each other, the inner circumferences of the arc-shaped steam seal ring block are axially provided with steam seal ring teeth corresponding to the main shaft of the turbine along the main shaft, wherein the suspension-type steam seal structure comprises a plurality of elongated metal sheets, the metal sheet is bent along the longitudinal direction of the elongated shape to form an elongated L-shape, one rim of the L-shaped metal sheet is a toothed rim alternately formed from a plurality of notches and fingers, the notches extend laterally through the entire toothed rim so that the other rim of the L-shaped metal sheet can be bent longitudinally toward the toothed rim to form an arc shape; the notches continue to extend to corresponding openings on the other rim, so that the fingers of the toothed rim suspend in the turbine steam seal gap due to the openings of the other rim and can perform elastic reciprocating movement up and down; the same type rims of the plurality of L-shaped metal sheets are correspondingly overlapped with each other, the notches and the fingers of the toothed rims of the plurality of L-shaped metal sheets are misaligned with each other to cover the notches, the other rims of the overlapped L-shaped metal sheets are fixed along the steam seal ring teeth in the arc-shaped steam seal ring blocks, wherein a space is provided in the arc-shaped steam seal ring block for at least a portion of the length containing an opening on the other rim of the metal sheet, the space allows the toothed rims of the metal sheet to perform elastic reciprocating movement down when subjected to the force at the top; the toothed rims of the overlapped L-shaped metal sheet are provided in a form-fitting manner to the seal ring teeth at the back of the steam facing side of the steam seal ring teeth, the top of the toothed rim protrudes out of the steam seal ring tooth for sealing the gap between the seal ring teeth and the main shaft of the turbine.

The scheme is further as follows: the L-shaped metal sheets are of at least two sheets, the widths of the notches of the toothed rims of the two L-shaped metal sheets are smaller than the widths of the fingers, the length of the opening on the other rim of the metal sheet extended from the notch of the toothed rim is equal to or greater than half of the width of the other rim of the metal sheet.

The scheme is further as follows: the L-shaped metal sheet is a steel or alloy copper or aluminum alloy elastic sheet having a hardness smaller than the hardness of a main shaft of the turbine, and thickness of the metal sheet is from 0.2 mm to 1 mm.

The scheme is further as follows: a teeth protecting sheet is provided at the steam downstream side of the toothed rims of the overlapped L-shaped metal sheets, and the teeth protecting sheet is used to enhance the bending strength of the toothed sheets of the steam seal belts.

The scheme is further as follows: the arc-shaped steam seal ring block is provided with a dovetail groove along the steam seal ring teeth, a steam seal frame matched with the dovetail groove is installed therein, the steam seal frame is provided with a socket for fixing the other rim of the L-shaped metal sheet, recesses are provided outside of the socket, and are used for the space allowing the toothed rims of the L-shaped metal sheet to perform elastic reciprocating movement down when subjected to the force at the top.

Compared with the prior art, the invention has the advantages of simple structure and the sealing between the main shaft side and the static and dynamic vane stage of the turbine is well achieved; and the main shaft of the turbine can be completely achieved by utilizing the elastic characteristics of the sealing sheet of the invention.

The present invention will be described below in details with reference to the accompanying drawings and embodiments.

DETAILED DESCRIPTION OF THE INVENTION

Embodiment 1

Figure 1:
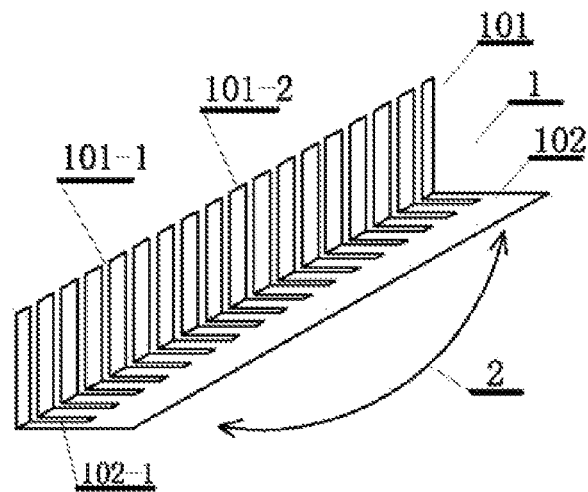
FIG. 1 is a schematic view of the elastic sheet structure of the present invention.

An elastic sheet used for a servo suspension-type steam seal belt is an elongated metal sheet. As shown in FIG. 1, the metal sheet 1 is longitudinally bent to form an elongated L-shaped sheet with an L-shaped cross section, the bending angle may be 80 degrees to 100 degrees, and the L-shaped metal sheet with an L-shaped cross section has a thickness from 0.2 mm to 1 mm, most preferably being 0.2 mm or 0.5 mm; it is an elastic metal sheet made of stainless steel, alloy copper, alloy aluminum and the like, one rim of the L-shaped metal sheet is a toothed rim 101 formed from a plurality of alternately arranged notches 101-1 and fingers 101-2, the notches extend laterally through the entire toothed rim so that the other rim 102 of the L-shaped metal sheet can be bent longitudinally toward the toothed rim to form an arc shape under the force 2; the notches continue to extend to corresponding openings 102-1 on the other rim, so that the fingers of the toothed rim suspend in the turbine steam seal gap due to the openings of the other rim and can perform elastic reciprocating movement up and down when subjected to the vertical pressure at the top.

In the embodiment, as a preferable solution, the L-shaped metal sheet is bent 90 degrees to form a right-angled L-shaped metal sheet, the notches extend laterally in direction perpendicular to the other rim of the metal sheet, and the widths of the notches are smaller than the widths of the fingers. The widths of the fingers are at least twice of the widths of the notches. As a preferable solution, the widths of the fingers are from 2 mm to 5 mm.

In order to make the toothed rim have good elasticity moving up and down, as a further preferable solution, the length of the openings on the other rim of the metal sheet is equal to or greater than half the width of the other rim of the metal sheet.

In the embodiment, the notches of the toothed rim are of a trapezoidal shape being wider at its upper end and narrower at its lower end, the trapezoidal-shaped notches are set with a trapezoidal angle so that the notches of the toothed rim change from trapezoidal-shaped notches into rectangular-shaped notches after the other rim of the metal sheet is bent into an arc shape; the openings on the other rim of the metal sheet extend from the narrower end of the trapezoidal-shaped notches.

Embodiment 2

Figure 2:
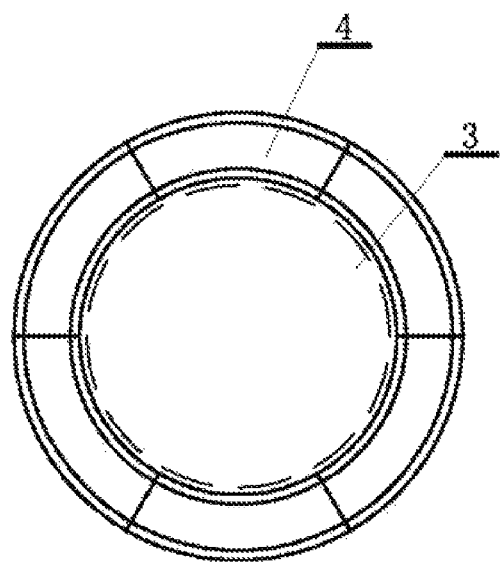
FIG. 2 is a schematic view of the overall structure of the seal of a turbine main shaft end.
Figure 3:
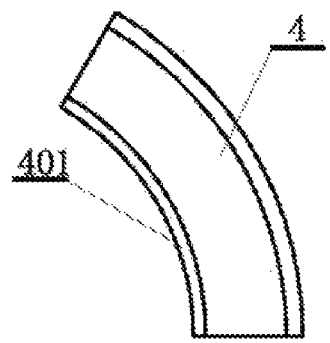
FIG. 3 is a schematic view of an arc-shaped steam seal ring block.
Figure 4:
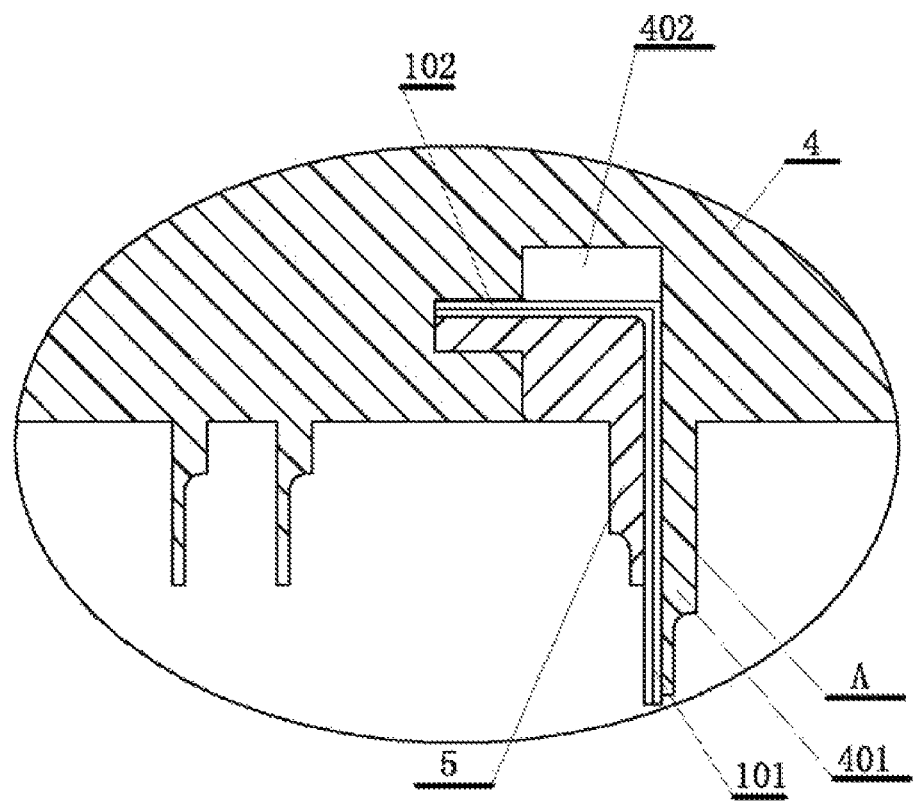
FIG. 4 is a schematic view of a suspension-type servo steam seal structure of the present invention.

A servo suspension-type steam seal structure for a turbine comprises a steam seal circular ring arranged around a turbine main shaft 3, as shown in FIG. 2, the steam seal circular ring is composed of a plurality of arc-shaped steam seal circular ring blocks 4 abutting each other, usually there are 6 arc-shaped steam seal circular ring blocks, as shown in FIG. 3 and FIG. 4, the inner circumference of the arc-shaped steam seal circular ring block is provided with steam seal ring teeth 401 corresponding to the main shaft of the turbine along the axial direction of the main shaft, wherein the servo suspension-type steam seal structure comprises a plurality of elongated metal sheets as described in embodiment 1, as shown in FIG. 1, the metal sheet is longitudinally bent to form an elongated L-shaped metal sheet with an L-shaped cross section, one rim of the L-shaped metal sheet is a toothed rim formed from a plurality of alternately arranged notches and fingers, the notches extend laterally through the entire toothed rim so that the other rim of the L-shaped metal sheet can be bent longitudinally toward the toothed rim to form an arc shape; the notches continue to extend to corresponding openings on the other rim, so that the fingers of the toothed rim suspend in the turbine steam seal gap due to the openings of the other rim and can perform elastic reciprocating movement up and down when subjected to the vertical pressure at the top; the same type rims of the plurality of L-shaped metal sheets are correspondingly overlapped with each other, the notches and the fingers of the toothed rims of the plurality of L-shaped metal sheets are misaligned with each other to cover the notches, the other rims 102 of the overlapped L-shaped metal sheets are fixed along the steam seal ring teeth in the arc-shaped steam seal ring blocks, wherein a space 402 for allowing the toothed rims to elastically suspend is provided in the arc-shaped steam seal ring block for at least a portion of the length (for example, from the center of the width of the other rim to the toothed rim) containing an opening on the other rim of the metal sheet, the space allows the toothed rims of the metal sheet to perform elastic reciprocating movement down when subjected to the force at the top; the toothed rims 101 of the overlapped L-shaped metal sheets are provided in a form-fitting manner to the seal ring teeth at the back of the steam facing side A of the steam seal ring teeth, the top of the toothed rim protrudes out of the steam seal ring tooth for sealing the gap between the seal ring teeth and the main shaft of the turbine. Generally, the gap between the steam seal ring teeth and the turbine main shaft is between 0.25 mm and 0.8 mm; therefore, the distance that the top of the toothed rim extending out from the steam seal ring teeth is usually 0.10 mm to 0.15 mm smaller than the gap.

Figure 5:
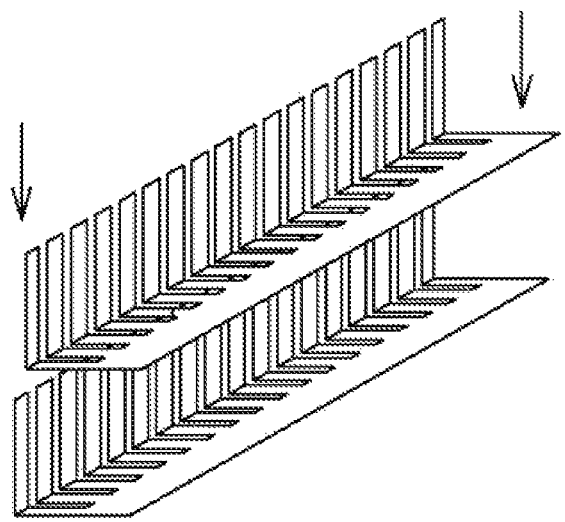
FIG. 5 is an exploded schematic view of the two overlapped elastic sheets of the present invention.

In the embodiment, the L-shaped metal sheets may be of three or four sheets according to the thickness and actual conditions of use. However, one preferred embodiment is two sheets, as shown in FIG. 5, the notches and the fingers of the toothed rims of the plurality of L-shaped metal sheets are misaligned with each other to cover the notches, therefore, the notches of the toothed rims of the two L-shaped metal sheets have widths smaller than the widths of the fingers; the length of the openings on the other rim of the metal sheet, which are extended from corresponding notches, is equal to or greater than half the width of the other rim of the metal sheet.

In the embodiment, since the structure of the elastic sheet used for the steam seal belt is different from the traditional steam seal structure, the air gap can be completely sealed so that the top of the elastic sheet will contact with the main shaft. Because of the elasticity of the toothed sheet, even if the main shaft shakes, sealing will not be affected. For the purpose that the elastic sheet will not scratch the main shaft, the L-shaped metal sheet is made of a steel or alloy copper or aluminum alloy having a hardness smaller than the hardness of the main shaft of the turbine, and the thickness of the metal sheet is usually selected to be from 0.2 mm to 1 mm, most preferably from 0.2 mm or 0.5 mm.

As a preferable solution, the L-shaped metal sheet is a 90 degree right-angled L-shaped metal sheet, the notches laterally extend and are perpendicular to the other rim of the metal sheet, and the widths of the fingers are at least twice of the widths of the notches. As a more preferable solution, the widths of the fingers are from 2 mm to 5 mm.

In the embodiment, as the steam pressure in the turbine is very high, and the elastic sheet should not be too thick in consideration of elasticity. Therefore, a thinner elastic sheet is usually selected. In order to enhance the bending resistance of the elastic sheet, a teeth protecting sheet 5 is provided at the steam downstream side of the toothed rims of the overlapped L-shaped metal sheets, and the teeth protecting sheet is used to enhance the bending strength of the toothed sheets of the steam seal belts, and the materials having a rigidity better than that of the elastic sheet can be selected.

Figure 6:
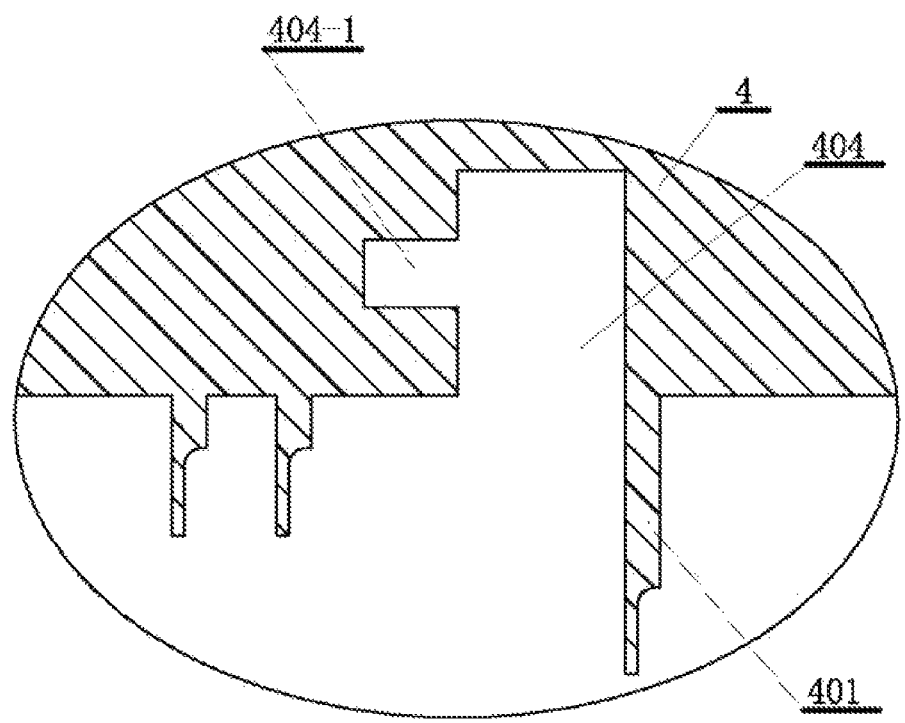
FIG. 6 is a schematic view of a mounting slot for elastic sheets of the arc-shaped steam seal ring block of the present invention.
Figure 7:
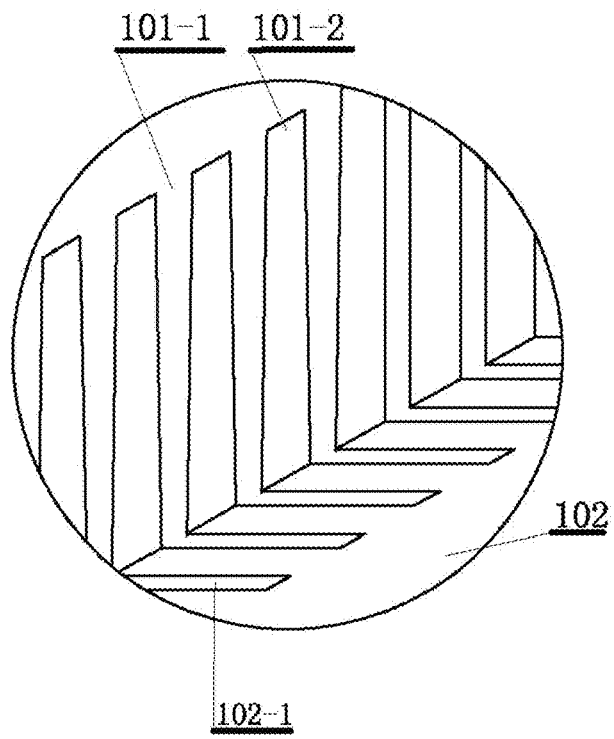
FIG. 7 is a schematic view of a dovetail groove of the arc-shaped steam seal ring block of the present invention.
Figure 8:
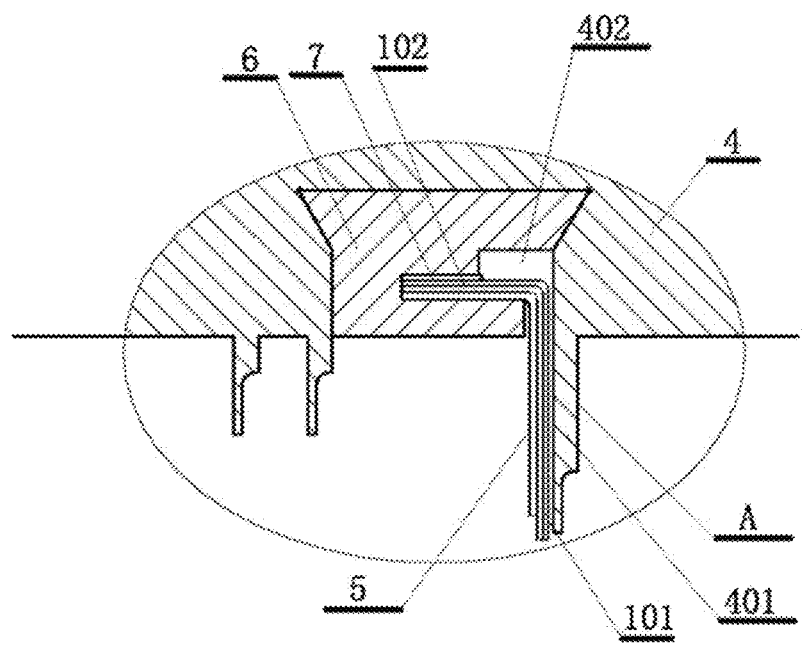
FIG. 8 is a schematic view of a mounting structure of the elastic sheet having a dovetail groove of the arc-shaped steam seal ring block of the present invention.

In the embodiment, since the elastic sheet is an L-shaped arc-shaped metal sheet, there are various methods for installation. As shown in FIG. 6, firstly, a notch 404 is provided along the surface (which faces downstream of the steam.) of the steam seal ring tooth in the arc-shaped steam seal ring block, which is as shown in FIG. 6 as a rectangular slot, a socket 404-1 inserted with the other rim of the right-angled L-shaped metal sheet is provided in the middle of one rim of the rectangular slot; then the other rim of the folded right-angled L-shaped metal sheet and the teeth protecting sheet are inserted according to FIG. 4; however, it is extremely difficult to install and adjust the L-shaped metal sheet directly on the arc-shaped steam seal ring block. Separation method structure can be used for installation, in order to facilitate the installation and adjustment, therefore, a preferable solution of this embodiment is as shown in FIG. 7, the arc-shaped steam seal ring block is provided with a dovetail groove 403 along the surface (which faces downstream of the steam.) of the steam seal ring teeth, as shown in FIG. 8, a steam seal frame 6 matched with the dovetail groove is installed therein, the steam seal frame is provided with a socket for fixing the other rim of the L-shaped metal sheet, recesses are provided outside of the socket, and are used for the space allowing the toothed rims of the L-shaped metal sheet to perform elastic reciprocating movement down when subjected to the force at the top. In actual operation, firstly, the elastic sheet and the steam seal frame are assembled, in the assembly process, the fixed firmness of the other rim of the metal sheet is adjusted through the tightening plug 7 disposed below the triangular arc-shaped metal sheet. Then the assembled elastic sheet and the steam seal frame are inserted into the dovetail groove of the arc-shaped steam seal block.

The invention claimed is:

1. An elastic elongated metal sheet used for a steam seal belt of a turbine, wherein the elastic elongated metal sheet is bent along its longitudinal axis to form a first rim and a second rim joined at the longitudinal axis so that the elastic elongated metal sheet has an L-shaped cross section when viewed from a direction of the longitudinal axis, the first rim of the elastic elongated metal sheet contains alternately arranged notches and fingers, the notches extend laterally through entire width of the first rim to the longitudinal axis so that the second rim of the elastic elongated metal sheet can be bent longitudinally toward the first rim to form an arc shape; the notches continue to extend laterally to corresponding openings on the second rim, so that, when used in a turbine, the fingers of the first rim suspend in a turbine steam seal gap of the turbine due to the openings on the second rim and can perform elastic reciprocating movement.

2. The elastic elongated metal sheet according to claim 1, wherein the elastic elongated metal sheet is a right-angled L-shaped metal sheet, the notches extend laterally and are perpendicular to the second rim of the elastic elongated metal sheet.

3. The elastic elongated metal sheet according to claim 2, wherein a width of the fingers of the first rim is from 2 mm to 5 mm.

4. The elastic elongated metal sheet according to claim 1, wherein a width of the notches is smaller than a width of the fingers.

5. The elastic elongated metal sheet according to claim 4, wherein a width of the fingers of the first rim is from 2 mm to 5 mm.

6. The elastic elongated metal sheet according to claim 1, wherein a length of the openings on the second rim of the elastic elongated metal sheet is equal to or greater than half a width of the second rim of the elastic elongated metal sheet.

7. The elastic elongated metal sheet according to claim 1, wherein a width of the fingers is from 2 mm to 5 mm.

8. The elastic elongated metal sheet according to claim 1, wherein the notches of the first rim are of a trapezoidal shape being wider at the top and narrower at the bottom thereof, the trapezoidal-shaped notches are set with a trapezoidal angle so that the notches of the first rim change from trapezoidal shape into right-angled rectangular shape when the second rim is bent into arc shape; the openings on the second rim of the elastic elongated metal sheet are connected to the notches at a narrower end of the trapezoidal-shaped notches.

9. A steam seal structure for a turbine, comprising a steam seal circular ring arranged around a main shaft of an engine, the steam seal circular ring comprises a plurality of arc-shaped steam seal circular ring blocks connected to each other, an inner circumference of the arc-shaped steam seal ring block arc blocks is axially provided with steam seal ring teeth along the main shaft, wherein the follow up steam seal structure comprises a plurality of elongated metal sheets, each of the elongated metal sheets is bent along its longitudinal axis to form a first rim and a second rim joined at the longitudinal axis so that each of the elongated metal sheets has an L-shaped cross section when viewed from a direction of the longitudinal axis, the first rim of each of the elongated metal sheets contains alternately arranged notches and fingers, the notches extend laterally through entire width of the first rim to the longitudinal axis so that the second rim of the elongated metal sheet can be bent longitudinally toward the first rim to form an arc shape; the notches continue to extend laterally to corresponding openings on the second rim, so that, when used in a turbine, the fingers of the first rim suspend in a gap between the steam seal ring teeth and the main shaft of the turbine due to the openings on the second rim and can perform elastic reciprocating movement; the same type rims of the plurality of elongated metal sheets are correspondingly overlapped with each other, the notches and the fingers of the first rims of the plurality of elongated metal sheets are misaligned with each other to cover the notches, the second rims of the overlapped elongated metal sheets are fixed along the steam seal ring teeth in the arc-shaped steam seal ring blocks, wherein a space is provided in the arc-shaped steam seal ring block for accommodating at least a portion of the length of the openings on the second rim of the elongated metal sheet, the space allows the first rims of the elongated metal sheets to perform elastic reciprocating movement when subjected to a force at the top; the first rims of the overlapped elongated metal sheets are provided in a form-fitting manner to the seal ring teeth at the back of a steam facing side A of the steam seal ring teeth, the top of the first rim protrudes out of the steam seal ring teeth for sealing the gap between the seal ring teeth and the main shaft of the turbine.

10. The steam seal structure according to claim 9, wherein the steam seal structure comprises at least two elongated metal sheets, a width of the notches of the first rims of the at least two elongated metal sheets is smaller than a width of the fingers of the first rims.

11. The steam seal structure according to claim 9, wherein a width of the fingers of the first rim is from 2 mm to 5 mm.

12. The steam seal structure according to claim 11, wherein a length of the openings on the second rim of the elongated metal sheet is equal to or greater than half of a width of the second rim of the elongated metal sheet.

13. The steam seal structure according to claim 12, wherein a thickness of the elongated metal sheet is from 0.2 mm to 1 mm.

14. The steam seal structure according to claim 11, wherein a thickness of the elongated metal sheet is from 0.2 mm to 1 mm.

15. The steam seal structure according to claim 14, wherein teeth for protecting the fingers of the first rims are provided at a steam downstream side of the first rims of the elongated metal sheets.

16. The steam seal structure according to claim 9, wherein the elongated metal sheet is a steel or alloy copper or aluminum alloy elastic sheet having a hardness smaller than a hardness of the main shaft of the turbine.

17. The steam seal structure according to claim 16, wherein teeth for protecting the fingers of the first rims are provided at a steam downstream side of the first rims of the elongated metal sheets.

18. The steam seal structure according to claim 9, wherein teeth for protecting the fingers of the first rims are provided at a steam downstream side of the first rims of the overlapped elongated metal sheets, and the teeth for protecting the fingers of the first rims are used to enhance a bending strength of the elongated metal sheets.

19. The steam seal structure according to claim 9, the wherein a rectangular slot is provided along a steam downstream side of the steam seal ring teeth in the arc-shaped steam seal ring block, a socket for receiving the second rims of the elongated metal sheets is provided in the middle of one side of the rectangular slot.

20. The steam seal structure according to claim 9, wherein the arc-shaped steam seal ring block is provided with a dovetail groove along the steam seal ring teeth, a steam seal frame matched with the dovetail groove is installed therein, the steam seal frame is provided with a socket for fixing the second rims of the elongated metal sheets, recesses are provided outside of the socket, and are used for the space allowing the first rims of the elongated metal sheets to perform elastic reciprocating movement when subjected to a force at the top.

* * * * *